(12) United States Patent
Pan et al.

(10) Patent No.: US 10,962,863 B2
(45) Date of Patent: Mar. 30, 2021

(54) INTERCHANGEABLE LENS, METHOD OF OPERATING INTERCHANGEABLE LENS, PROGRAM, LENS SYSTEM, AND CAMERA SYSTEM

(71) Applicant: FUJIFILM Corporation, Tokyo (JP)

(72) Inventors: Yi Pan, Saitama (JP); Junji Hayashi, Saitama (JP); Kazufumi Sugawara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 269 days.

(21) Appl. No.: 15/942,562

(22) Filed: Apr. 1, 2018

(65) Prior Publication Data

US 2018/0224721 A1 Aug. 9, 2018

Related U.S. Application Data

(63) Continuation of application No. PCT/JP2016/077827, filed on Sep. 21, 2016.

(30) Foreign Application Priority Data

Oct. 20, 2015 (JP) ................ JP2015-206717

(51) Int. Cl.
G02B 7/02 (2021.01)
G03B 17/14 (2021.01)
(Continued)

(52) U.S. Cl.
CPC ........... *G03B 17/14* (2013.01); *G03B 17/565* (2013.01); *H04N 5/2254* (2013.01); *H04N 5/23209* (2013.01); *G03B 2206/00* (2013.01)

(58) Field of Classification Search
CPC ...................................... G03B 17/14
(Continued)

(56) References Cited

U.S. PATENT DOCUMENTS 8,757,904 B2 6/2014 Hasuda et al.
2011/0229115 A1 9/2011 Okada
(Continued)

FOREIGN PATENT DOCUMENTS

CN 101285986 10/2008
CN 102890392 1/2013
(Continued)

OTHER PUBLICATIONS

Office Action of Japan Counterpart Application, with English translation thereof, dated Feb. 21, 2019, pp. 1-4.
(Continued)

*Primary Examiner* — James C. Jones
(74) *Attorney, Agent, or Firm* — JCIPRNET

(57) ABSTRACT

A lens system according to a first aspect of the present invention includes an interchangeable lens, and an accessory which is mounted between the interchangeable lens and a camera body. The interchangeable lens is mountable to the camera body via the accessory and includes a lens-side communication unit that communicates with the camera body and the accessory, an accessory information acquisition unit that communicates with the accessory to acquire individual identification information of the accessory, an interchangeable lens information storage unit that stores individual identification information of the interchangeable lens, and an identification information generation unit that generates combination identification information which is information unique to a combination of the interchangeable lens and the accessory on the basis of the acquired individual identification information of the accessory and the stored individual identification information of the interchangeable lens, and the lens-side communication unit transmits the generated combination identification information to the camera body.

18 Claims, 9 Drawing Sheets

(51) Int. Cl.
    *H04N 5/225*     (2006.01)
    *G03B 17/56*     (2021.01)
    *H04N 5/232*     (2006.01)

(58) Field of Classification Search
    USPC ....................................................... 359/827
    See application file for complete search history.

(56) References Cited

U.S. PATENT DOCUMENTS

| | | |
|---|---|---|
| 2012/0033955 A1 | 2/2012 | Okada |
| 2015/0117792 A1 | 4/2015 | Itagaki et al. |

FOREIGN PATENT DOCUMENTS

| | | | | |
|---|---|---|---|---|
| CN | 104950556 | 9/2015 | | |
| JP | S61149939 | 7/1986 | | |
| JP | H01137241 | 5/1989 | | |
| JP | H06027515 | 2/1994 | | |
| JP | H07234432 | 9/1995 | | |
| JP | 2005072908 | 3/2005 | | |
| JP | 2006171392 | * 6/2006 | ............... | G02B 7/02 |
| JP | 2010054629 | 3/2010 | | |
| JP | 2010226666 | 10/2010 | | |
| JP | 2010261984 | 11/2010 | | |
| JP | 2012037692 | 2/2012 | | |
| JP | 2013047768 | 3/2013 | | |
| JP | 2013064774 | 4/2013 | | |
| JP | 2015055658 | 3/2015 | | |
| JP | 2015088922 | 5/2015 | | |

OTHER PUBLICATIONS

"Office Action of China Counterpart Application," with English translation thereof, dated Jan. 02, p. 1-p. 20.

"Office Action of Japan Counterpart Application", dated May 11, 2020, with English translation thereof, p. 1-p. 5.

"International Search Report (Form PCT/ISA/210)" of PCT/JP2016/077827, dated Dec. 6, 2016, with English translation thereof, pp. 1-5.

"International Preliminary Report on Patentability (Form PCT/IPEA/409) of PCT/JP2016/077827", dated Nov. 28, 2017, with English translation thereof, pp. 1-15.

"Office Action of Japan Counterpart Application" with English translation thereof, dated Nov. 25, 2020, p. 1-p. 5.

* cited by examiner

FIG. 8

| L_ID | 48P10058 | 0 | 1 | 2 | 3 | 4 | 5 | 6 | 7 |
|---|---|---|---|---|---|---|---|---|---|
| L_ID | 48P10058 | 4 | 8 | P | 1 | 0 | 0 | 5 | 8 |
| T_ID | 55P20045 | 5 | 5 | P | 2 | 0 | 0 | 4 | 5 |
| L_ID[i] | | 52 | 56 | 80 | 49 | 48 | 48 | 53 | 56 |
| T_ID[i] | | 53 | 53 | 80 | 50 | 48 | 48 | 52 | 53 |
| L_ID[i] +T_ID[i] | | 105 | 109 | 160 | 99 | 96 | 96 | 105 | 109 |
| LTID[i] | | 102 | 107 | 77 | 98 | 122 | 97 | 108 | 113 |
| LTID[i]_hex | | 66 | 6B | 4D | 62 | 7A | 61 | 6C | 71 |
| LTID | | f | k | M | b | z | a | l | q |

FIG. 9

| DECIMAL | HEXADECIMAL | LETTER |
|---|---|---|
| ... | ... | ... |
| 48 | 30 | 0 |
| 49 | 31 | 1 |
| 50 | 32 | 2 |
| 51 | 33 | 3 |
| 52 | 34 | 4 |
| 53 | 35 | 5 |
| 54 | 36 | 6 |
| 55 | 37 | 7 |
| 56 | 38 | 8 |
| 57 | 39 | 9 |
| ... | ... | ... |
| 65 | 41 | A |
| 66 | 42 | B |
| 67 | 43 | C |
| 68 | 44 | D |
| 69 | 45 | E |
| 70 | 46 | F |
| 71 | 47 | G |
| 72 | 48 | H |
| 73 | 49 | I |
| 74 | 4A | J |
| 75 | 4B | K |
| 76 | 4C | L |
| 77 | 4D | M |
| 78 | 4E | N |
| 79 | 4F | O |
| 80 | 50 | P |
| 81 | 51 | Q |
| 82 | 52 | R |
| 83 | 53 | S |
| 84 | 54 | T |
| 85 | 55 | U |
| 86 | 56 | V |
| 87 | 57 | W |
| 88 | 58 | X |
| 89 | 59 | Y |
| 90 | 5A | Z |
| ... | ... | ... |
| 97 | 61 | a |
| 98 | 62 | b |
| 99 | 63 | c |
| 100 | 64 | d |
| 101 | 65 | e |
| 102 | 66 | f |
| 103 | 67 | g |
| 104 | 68 | h |
| 105 | 69 | i |
| 106 | 6A | j |
| 107 | 6B | k |
| 108 | 6C | l |
| 109 | 6D | m |
| 110 | 6E | n |
| 111 | 6F | o |
| 112 | 70 | p |
| 113 | 71 | q |
| 114 | 72 | r |
| 115 | 73 | s |
| 116 | 74 | t |
| 117 | 75 | u |
| 118 | 76 | v |
| 119 | 77 | w |
| 120 | 78 | x |
| 121 | 79 | y |
| 122 | 7A | z |
| ... | ... | ... |

INTERCHANGEABLE LENS, METHOD OF OPERATING INTERCHANGEABLE LENS, PROGRAM, LENS SYSTEM, AND CAMERA SYSTEM

CROSS-REFERENCE TO RELATED APPLICATIONS

This application is a Continuation of PCT International Application No. PCT/JP2016/077827 filed on Sep. 21, 2016, which claims priority under 35 U.S.C § 119(a) to Japanese Patent Application No. 2015-206717 filed on Oct. 20, 2015. Each of the above application(s) is hereby expressly incorporated by reference, in its entirety, into the present application.

BACKGROUND OF THE INVENTION

1. Field of the Invention

The present invention relates to an interchangeable lens, a method of operating an interchangeable lens, a program, a lens system, and a camera system, and more particularly to an interchangeable lens that can be mounted on a camera body via an accessory, a method of operating such an interchangeable lens, a program, a lens system including an interchangeable lens, and a camera system.

2. Description of the Related Art

In a camera system in which various interchangeable lenses can be mounted on a camera body, in a case where the interchangeable lens is mounted on the camera body, various types of lens data for control and correction are downloaded to the camera body, and control or correction optimized for the mounted interchangeable lens is performed. Further, in such a camera system, an accessory is mounted on the interchangeable lens or the camera body for the purpose of obtaining desired optical characteristics, and in a camera system corresponding to such an accessory, lens data optimized for the mounted accessory is downloaded. In order to obtain optimal lens data in such a camera system, it is necessary to identify the mounted interchangeable lens or accessory.

For example, in the camera system described in JP2012-037692A, the accessory acquires lens identification information from the interchangeable lens in order to switch a communication path between the camera body and the interchangeable lens. Further, in the communication module described in JP2005-072908A, a communication module attached to a main body of an electronic device includes acquisition means for acquiring a model number of the communication module and a serial number of the main body through communication with the main body, and generation means for generating a unique identification code using the model number and the serial number, thereby generating an identification code unique to the communication module without mounting a nonvolatile memory.

SUMMARY OF THE INVENTION

In a case where an interchangeable lens is mounted on a camera body, lens data is stored in the camera body in a case where a certain interchangeable lens is mounted on the camera body for the first time, and then, the stored lens data is used in a case where the interchangeable lens is the same individual lens, thereby omitting downloading of the lens data and shortening an activation time.

However, in a camera system including the interchangeable lens and the camera body, in a case where mounting achievement is determined using the identification information of the interchangeable lens as in the related art, a determination is made that "there is the mounting achievement" despite the fact that the accessory is mounted (and therefore the lens data is different from that of the interchangeable lens alone) in a case where the interchangeable lens having the mounting achievement alone is mounted on the camera body together with the accessory, and the lens data optimized for the combination of the interchangeable lens and the accessory cannot be downloaded.

Further, in JP2012-037692A, a type (a model) of interchangeable lens is discriminated. However, since characteristics of the interchangeable lens vary among individuals, individuals cannot be discriminated only using the type (the model) of interchangeable lens, and optimal lens data cannot be obtained. Further, in JP2005-072908A, the unique identification code is generated using the model number of the communication module and the serial number of the electronic device body. However, an individual difference of the device (in this case, the communication module) that is used together with the electronic device body has not been taken into consideration.

Thus, in the related art, it is impossible to correctly identify the combination of the interchangeable lens and the accessory, and as a result, it is difficult to generate or acquire lens data optimized for the mounted accessory.

The present invention has been made in view of the above circumstances and an object of the present invention is to provide an interchangeable lens capable of correctly identifying a combination of an interchangeable lens and an accessory, a method of operating the interchangeable lens, a non-transitory recording medium readable by a computer for recording a program, a lens system, and a camera system.

In order to achieve the above object, an interchangeable lens according to a first aspect of the present invention is an interchangeable lens that is mountable to a camera body via an accessory, the interchangeable lens comprising: a lens-side communication unit that communicates with the camera body and the accessory, an accessory information acquisition unit that communicates with the accessory to acquire individual identification information of the accessory; an interchangeable lens information storage unit that stores individual identification information of the interchangeable lens; and an identification information generation unit that generates combination identification information which is information unique to a combination of the interchangeable lens and the accessory on the basis of the acquired individual identification information of the accessory and the stored individual identification information of the interchangeable lens, wherein the lens-side communication unit transmits the generated combination identification information to the camera body.

In the interchangeable lens according to the first aspect, since the combination identification information that is unique information for the combination of the interchangeable lens and the accessory is generated on the basis of the individual identification information of the interchangeable lens and the accessory, it is possible to correctly identify the combination of the interchangeable lens and the accessory in consideration of an individual difference between the interchangeable lens and the accessory.

In the first aspect, according to the interchangeable lens according to a second aspect, the identification information generation unit generates the combination identification information according to the same format and data size as the individual identification information of the interchangeable lens. According to the second aspect, since the combination identification information has the same format and data size as the individual identification information of the interchangeable lens, suitability of the combination identification information between the camera body and the interchangeable lens is secured.

In the first or second aspect, the interchangeable lens according to a third aspect comprises a lens data acquisition unit that acquires lens data corresponding to the combination of the interchangeable lens and the accessory, and the lens-side communication unit transmits the combination identification information and the acquired lens data to the camera body in association with each other. According to the third aspect, a correspondence between the combination identification information and the lens data becomes clear. Note that the "acquisition" of the lens data in the third aspect may be performed by the interchangeable lens generating lens data, or may be performed by acquiring the lens data from the camera body, various recording media, a network, or the like.

In the third aspect, according to the interchangeable lens according to a fourth aspect, the accessory information acquisition unit acquires information on optical characteristics of the accessory, the interchangeable lens information storage unit stores lens data of the interchangeable lens, and the lens data acquisition unit generates lens data corresponding to the combination of the interchangeable lens and the accessory on the basis of the acquired information on the optical characteristics of the accessory and the stored lens data of the interchangeable lens. The fourth aspect is an aspect in which the interchangeable lens generates lens data corresponding to the combination of the interchangeable lens and the accessory. Note that in the fourth aspect, an example of optical information of the accessory can include a rate of a change in a focal length or a degree of change in a diaphragm, but the present invention is not limited thereto.

In any one of the first to fourth aspects, according to the interchangeable lens according to a fifth aspect, the lens-side communication unit communicates with the accessory via a communication signal line between the camera body and the interchangeable lens. In the fifth aspect, it is not necessary to provide a new terminal or communication signal line in order to perform communication between the interchangeable lens and the accessory.

To achieve the above object, a method of operating an interchangeable lens according to a sixth aspect of the present invention is a method of operating an interchangeable lens that is mountable on a camera body via an accessory, and comprises an accessory information acquisition step of communicating with the accessory to acquire individual identification information of the accessory; an identification information generation step of generating combination identification information which is information unique to a combination of the interchangeable lens and the accessory on the basis of the acquired individual identification information of the accessory and individual identification information of the interchangeable lens; and an identification information transmitting step of transmitting the generated combination identification information to the camera body. According to the sixth aspect, it is possible to correctly identify the combination of the interchangeable lens and the accessory in consideration of an individual difference between the interchangeable lens and the accessory, as in the first aspect. In the sixth aspect, the same configuration as those in the second to fifth aspects may be further included.

To achieve the above object, a non-transitory recording medium readable by a computer for recording a program according to a seventh aspect of the present invention causes an interchangeable lens mountable on a camera body via an accessory to execute the operating method according to the sixth aspect. According to the seventh aspect, it is possible to correctly identify the combination of the interchangeable lens and the accessory in consideration of an individual difference between the interchangeable lens and the accessory, as in the first and sixth aspects. The program according to the seventh aspect can be recorded on a non-transitory recording medium such as various semiconductor memories or magneto-optical recording media and used. Note that in the seventh aspect, the same configuration as those in the second to fifth aspects may be further included.

To achieve the above object, a lens system according to an eighth aspect of the present invention comprises the interchangeable lens according to any one of the first aspect to the fifth aspect, and an accessory that is mounted between the interchangeable lens and the camera body, and the accessory includes an accessory-side communication unit that communicates with the interchangeable lens; and an accessory information storage unit in which individual identification information of the accessory is stored, and the accessory-side communication unit transmits the individual identification information of the accessory to the interchangeable lens. According to the eighth aspect, it is possible to correctly identify the combination of the interchangeable lens and the accessory in consideration of an individual difference between the interchangeable lens and the accessory, as in the first, sixth, and seventh aspects.

In the eighth aspect, according to the lens system according to a ninth aspect, the individual identification information of the accessory is described according to the same data format and data size as the individual identification information of the interchangeable lens. According to the ninth aspect, since the individual identification information of the accessory is described with the same format and data size as those of the individual identification information of the interchangeable lens, suitability of the individual identification information between the interchangeable lens and the accessory and suitability of the combination identification information between the interchangeable lens and the camera body are secured.

In the eighth or the ninth aspect, according to the lens system according to a tenth aspect, the accessory information storage unit stores information on the optical characteristics of the accessory, and the accessory-side communication unit transmits the information on the optical characteristics of the accessory to the interchangeable lens. According to the tenth aspect, the interchangeable lens can perform a process in which information on the optical characteristics of the accessory is reflected. Note that in the tenth aspect, an example of optical information of the accessory can include a rate of a change in a focal length or a degree of change in a diaphragm, but the present invention is not limited thereto.

In any one of the eighth to tenth aspects, according to the lens system according to an eleventh aspect, the accessory-side communication unit communicates with the interchangeable lens via a communication signal line between the camera body and the interchangeable lens. According to the eleventh aspect, it is not necessary to provide a new terminal or communication signal line in order to perform communication between the interchangeable lens and the accessory.

In any one of the eighth to eleventh aspects, according to the lens system according to a twelfth aspect, the accessory comprises a teleconversion lens that makes a focal length of the lens system longer than a focal length of the interchangeable lens in a state in which the accessory is mounted on the interchangeable lens. The twelfth aspect is an example of an aspect of the accessory.

To achieve the above object, a camera system according to a thirteenth aspect of the present invention is a camera system including the lens system according to any one of the eighth to twelfth aspects, and a camera body on which the lens system is mounted, wherein the camera body comprises: a lens data storage unit that stores combination identification information and lens data of the lens system in association with each other; a lens system information acquisition unit that communicates with the interchangeable lens and acquires the combination identification information for the lens system mounted on the camera body; a determination unit that determines whether or not the lens data of the lens system mounted on the camera body is stored in the lens data storage unit on the basis of the acquired combination identification information; and a lens data acquisition unit that acquires the lens data of the mounted lens system from the interchangeable lens in a case where it is determined that the lens data of the mounted lens system is not stored. According to the thirteenth aspect, it is possible to correctly identify the combination of the interchangeable lens and the accessory in consideration of individual differences between the interchangeable lens and the accessory, similarly to the first, sixth, seventh, and eighth aspects.

According to a camera system according to a fourteenth aspect, in the thirteenth aspect, in a case where a captured image obtained by imaging a subject is recorded, the camera body records individual identification information of the interchangeable lens in a data file of the captured image irrespective of whether or not the accessory is mounted on the camera body. According to the fourteenth aspect, it is possible to identify the individual interchangeable lens used for acquisition of the captured image.

By using the interchangeable lens, the method of operating the interchangeable lens, the program, the lens system, and the camera system according to the present invention, it is possible to correctly identify the combination of the interchangeable lens and the accessory in consideration of the individual difference between the interchangeable lens and the accessory.

BRIEF DESCRIPTION OF THE DRAWINGS

FIG. 8 is a table illustrating an example of serial number generation for the combination of the interchangeable lens and the teleconverter.

FIG. 9 is a table illustrating some of ASCII codes.

DESCRIPTION OF THE PREFERRED EMBODIMENTS

Hereinafter, embodiments of the present invention will be described in detail with reference to the accompanying drawings. Note that in the embodiment, a case where an accessory in the present invention is a teleconverter (a teleconversion lens) will be described. However, in the present invention, the accessory may be a wide converter (a wide conversion lens), a mount adapter, an antivibration adapter, or a macro extension tube. In the following description, the "teleconverter" may be appropriately abbreviated as a "teleconverter".

Figure 1:
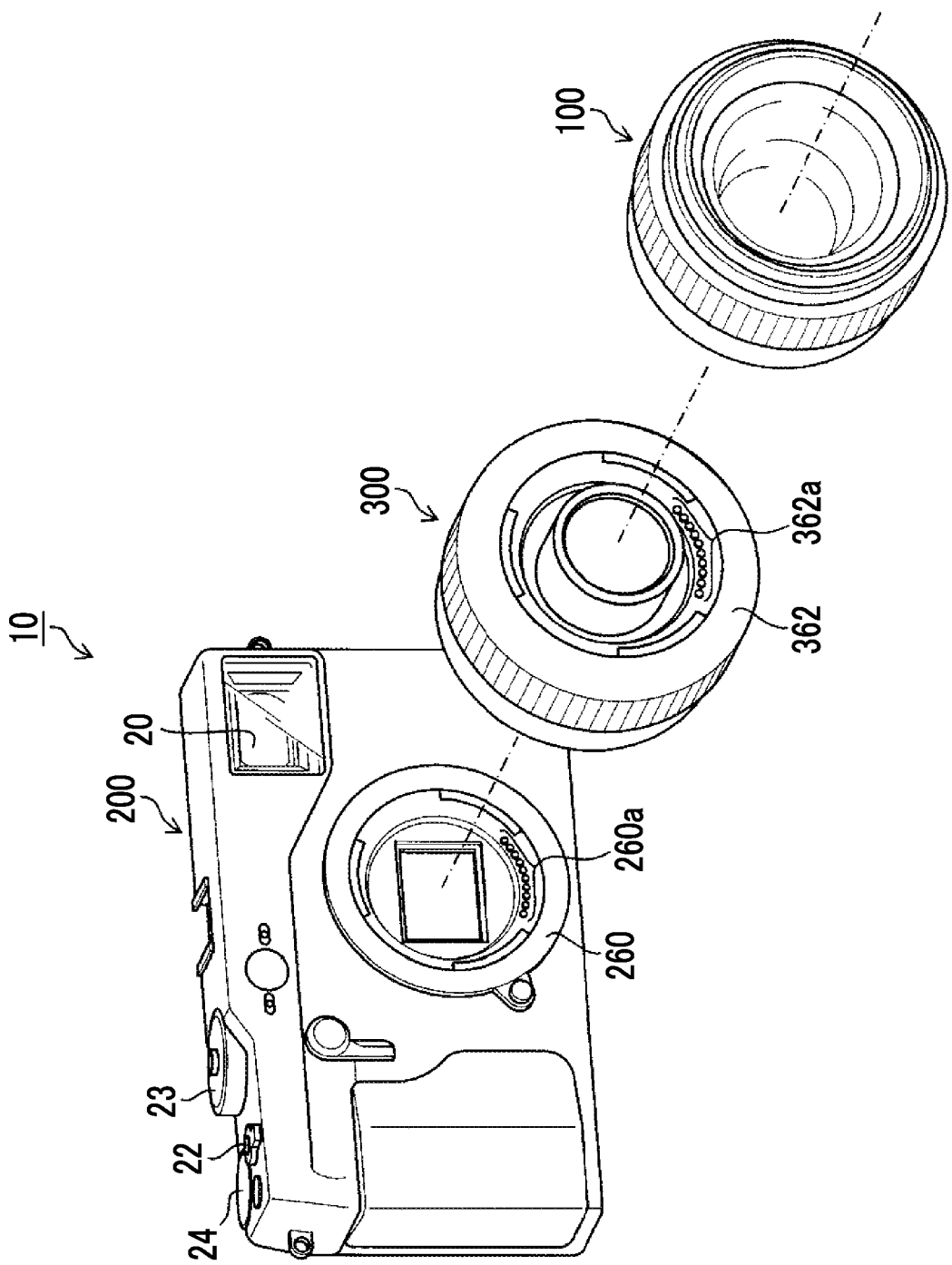
FIG. 1 is an external perspective view of a camera system according to an embodiment of the present invention.
Figure 2:
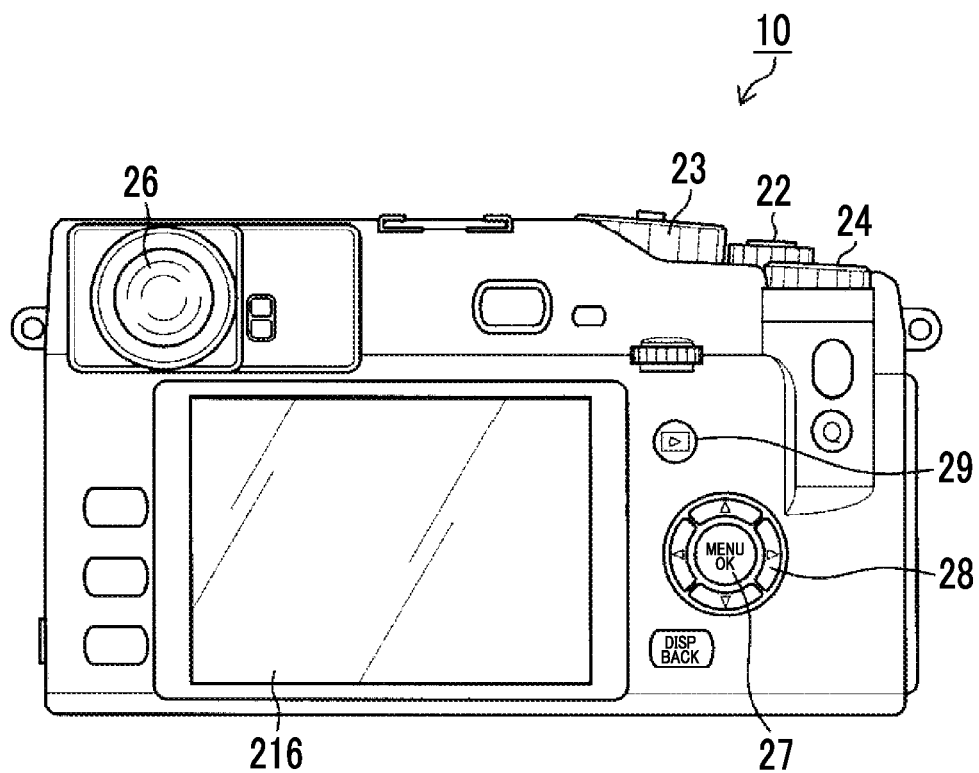
FIG. 2 is a rear view of the camera system according to the embodiment of the present invention.
Figure 3:
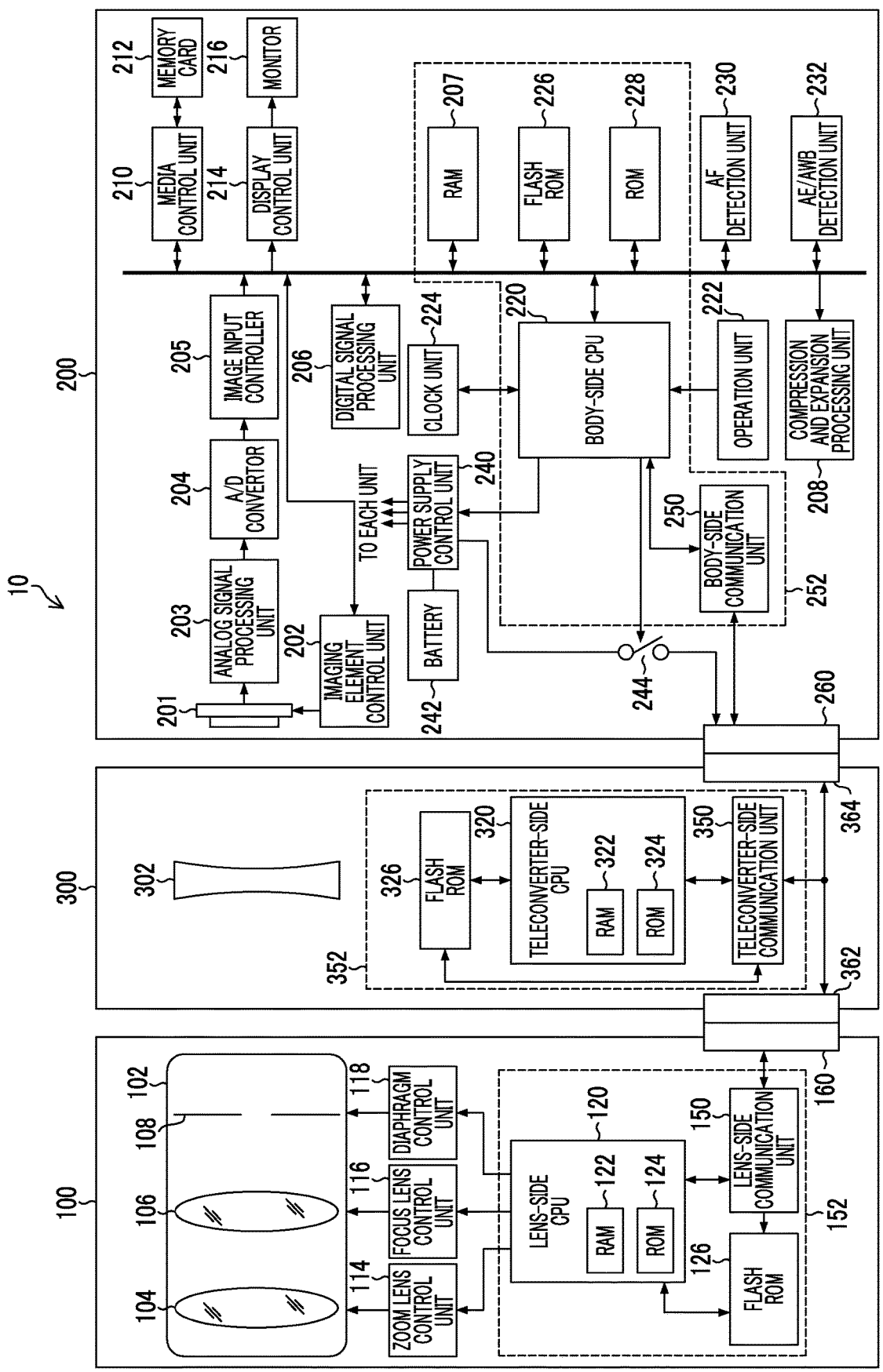
FIG. 3 is a block diagram illustrating a main configuration of the camera system according to the embodiment of the present invention.

FIGS. 1 and 2 are a perspective view and a rear view illustrating an appearance of an imaging device 10 (camera system) according to an embodiment of the present invention, and FIG. 3 is a block diagram illustrating a main configuration of the imaging device 10.

As illustrated in FIGS. 1 to 3, an imaging device 10 includes an interchangeable lens 100 (interchangeable lens), a camera body 200 (camera body), and a teleconverter 300 (accessory). The teleconverter 300 includes a distal end side mount 362 and a proximal end side mount 364 (FIG. 3). The interchangeable lens 100 includes a lens mount 160 (FIG. 3) detachably attached to the distal end side mount 362 of the teleconverter 300. The interchangeable lens 100 of this example has a cylindrical shape, and the lens mount 160 is formed at a proximal end of the interchangeable lens 100. The camera body 200 includes a body mount 260 to which the proximal end side mount 364 (FIG. 3) of the teleconverter 300 is detachably attached. The camera body 200 of this example has a box shape, and the body mount 260 is formed substantially at a center of a front face of the camera body 200. The lens mount 160 of the interchangeable lens 100 is mounted on the distal end side mount 362 of the teleconverter 300 and the proximal end side mount 364 of the teleconverter 300 is mounted on the body mount 260 of the camera body 200 so that the interchangeable lens 100 and the teleconverter 300 are detachably mounted on the camera body 200.

Note that the interchangeable lens 100 and the teleconverter 300 constitute the lens system according to the present invention.

Note that although a case where the interchangeable lens 100 is mounted on the camera body 200 via the teleconverter 300 will be described in this embodiment, the interchangeable lens 100 can be directly mounted on the camera body 200.

Figure 4:
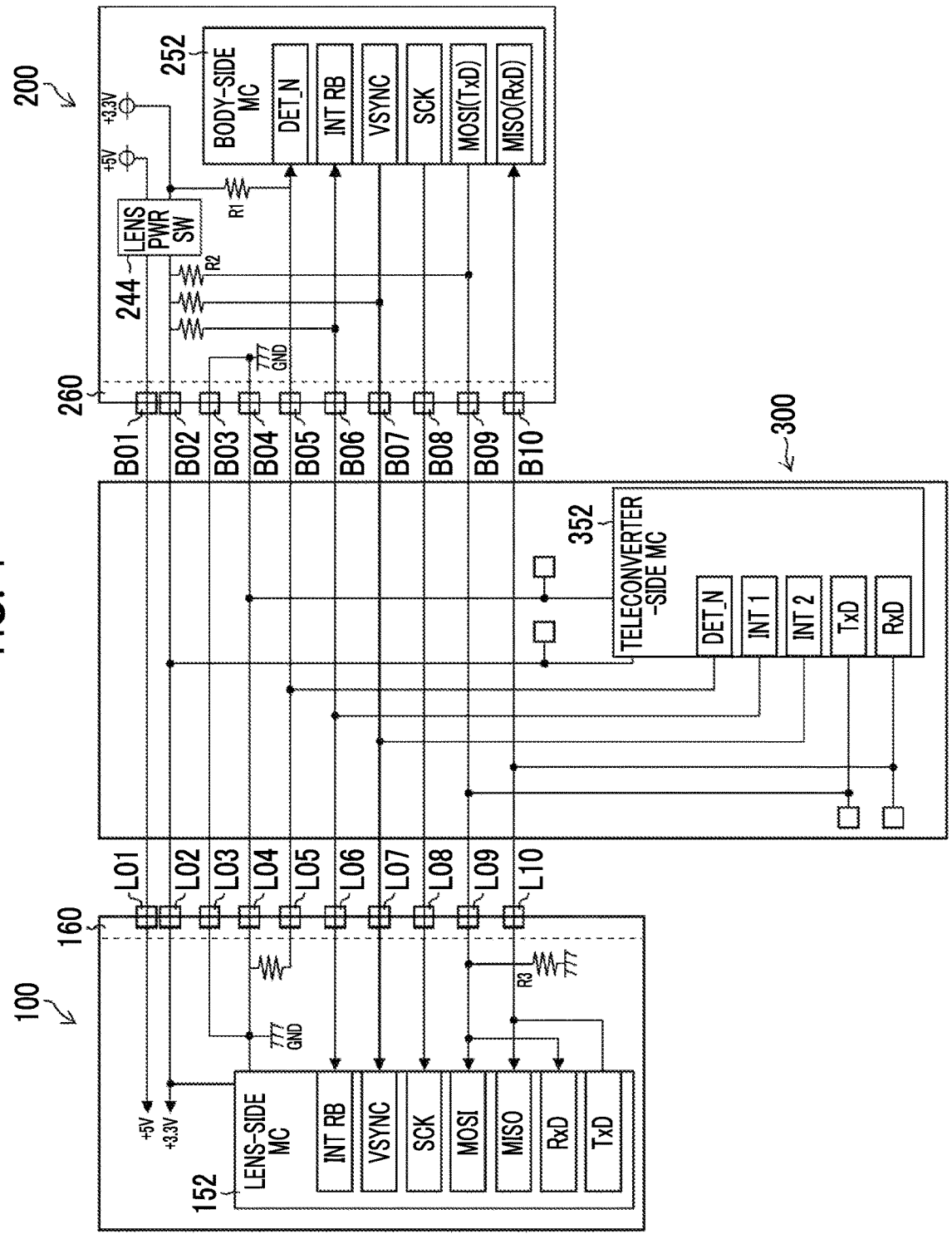
FIG. 4 is a diagram illustrating a configuration of a communication signal line in the camera system according to the embodiment of the present invention.

The lens mount 160, the body mount 260, the distal end side mount 362 and the proximal end side mount 364 of the teleconverter 300 are each provided with a plurality of terminals as contact points. In FIG. 1, a plurality of terminals 260a (body-side terminals) of the body mount 260 and a plurality of terminals 362a of the distal end side mount 362 are illustrated. In a case where the lens mount 160 is mounted on the distal end side mount 362 and the proximal end side mount 364 is mounted on the body mount 260, the mutual terminals of the lens mount 160, the body mount 260, the distal end side mount 362, and the proximal end side mount 364 are brought into contact with each other for conduction (FIGS. 3 and 4). In this example, the plurality of terminals are provided in each of the body mount 260, the lens mount 160, the distal end side mount 362, and the proximal end side mount 364 along a circumferential direction of the interchangeable lens 100.

An optical finder window 20 is mainly provided on the front face of the camera body 200. A shutter release button 22, a shutter speed dial 23, and an exposure correction dial 24 are mainly provided on a top surface of the camera body 200.

The shutter release button 22 is operation means for inputting an instruction to start imaging, and is configured as a two-step stroke type switch including so-called "half press" and "full press". In the imaging device 10, in a case where an S1 ON signal is output by half-pressing the shutter release button 22 (an operation of pressing the shutter release button 22 until the middle of a stroke), and an S2 ON signal is output by further fully pressing the shutter release button 22 (a full stroke pressing operation) from the half-press. In a case where the S1 ON signal is output, an imaging preparation process such as automatic focusing (AF process) and automatic exposure control (AE process) is executed, and in a case where the S2 ON signal is output, an imaging process is executed. Further, in the case of a video imaging mode, in a case where the shutter release button 22 is full-pressed, a video recording mode starts.

Note that the shutter release button 22 is not limited to the form of the 2-step stroke type switch including half press and full press, but the S1 ON signal and the S2 ON signal may be output through one operation, or individual switches may be provided to output the S1 ON signal or the S2 ON signal. Further, in a form in which an operation instruction is performed by a touch panel or a like, the operation means may output an operation instruction by an area corresponding to the operation instruction displayed on a screen of the touch panel being touched. In the present invention, a form of the operation means is not limited thereto as long as the operation means instructs the imaging preparation process or the imaging process. Further, the imaging preparation process and the imaging process may be continuously executed through an operation instruction in one operation means.

A user performs adjustment of a shutter speed using the shutter speed dial 23 and performs correction of exposure using the exposure correction dial 24.

FIG. 2 is a rear view of the imaging device 10. A monitor 216, an eyepiece portion 26 of an optical finder, a MENU/OK key 27, a cross key 28, a playback button 29, and the like are mainly provided on a back surface of the camera body 200, as illustrated in FIG. 2.

The liquid crystal monitor 216 displays a live view image, displays a captured image in a case where the playback button 29 is pressed, or displays a captured video. Further, the monitor 216 appropriately displays a message for requesting the user to input instructions or make a confirmation at the time of data acquisition or updating of the interchangeable lens 100 or the teleconverter 300.

Further, the user can perform various settings of the imaging device 10 using the MENU/OK key 27 and the cross key 28. For example, the user can perform switching between a still image capturing mode and a video imaging mode, and setting of whether or not specific image processing (a resolution enhancement process such as a point image restoration process) is executed, or data acquisition or updating of the interchangeable lens 100 or the teleconverter 300 using the MENU/OK key 27 and the cross key 28.

FIG. 3 is a block diagram illustrating an overall configuration of the imaging device 10.

<Configuration of Interchangeable Lens>

The interchangeable lens 100 includes an imaging optical system 102 (a zoom lens 104, a focus lens 106, and a diaphragm 108), a zoom lens control unit 114, a focus lens control unit 116, a diaphragm control unit 118, a lens-side central processing unit (CPU) 120 (an accessory information acquisition unit, an identification information generation unit, and a lens data acquisition unit), a flash read only memory (flash ROM) 126 (interchangeable lens information storage unit), a lens-side communication unit 150 (a lens-side communication unit), and a lens mount 160. The lens-side microcomputer (MC) 152 includes a lens-side CPU 120, a flash ROM 126, and a lens-side communication unit 150.

The imaging optical system 102 includes the zoom lens 104, the focus lens 106, and the diaphragm 108. The zoom lens control unit 114 controls a position of the zoom lens 104 according to a command from the lens-side CPU 120. The focus lens control unit 116 controls a position of the focus lens 106 according to a command from the lens-side CPU 120. The diaphragm control unit 118 controls a diaphragm area of the diaphragm 108 according to a command from the lens-side CPU 120.

The lens-side CPU 120 is a central processing unit (CPU) of the interchangeable lens 100, and includes a read only memory (ROM) 124 and a random access memory (RAM) 122 built thereinto.

The flash ROM 126 is a nonvolatile memory that stores firmware or lens data of the interchangeable lens 100 downloaded from the camera body 200 or acquired via a recording medium or a network, a serial number (individual identification information) of the interchangeable lens 100, and the like.

The lens-side CPU 120 controls each unit of the interchangeable lens 100 using the RAM 122 as a work area according to a control program (firmware) stored in the ROM 124 or the flash ROM 126.

The lens-side communication unit 150 performs communication with the camera body 200 and the teleconverter 300 via a plurality of signal terminals provided on the lens mount 160 in a state in which the interchangeable lens 100 is mounted on the camera body 200 via the teleconverter 300.

<Configuration of Camera Body>

The camera body 200 includes an imaging element 201, an imaging element control unit 202, an analog signal processing unit 203, an analog/digital (A/D) convertor 204, an image input controller 205, a digital signal processing unit 206, a RAM 207, a compression and expansion processing unit 208, a media control unit 210, a memory card 212, a display control unit 214, a monitor 216, a body-side CPU 220 (a lens system information acquisition unit, a determination unit, and a lens data acquisition unit), an operation unit 222, a clock unit 224, a flash ROM 226 (a lens data storage unit), a ROM 228, an automatic focus (AF) detection unit 230, an automatic exposure/automatic white balance (AE/AWB) detection unit 232, a power control unit 240, a battery 242, a body-side communication unit 250, and a body mount 260. A body-side microcomputer (MC) 252 includes the body-side CPU 220, the RAM 207, the ROM 228, the flash ROM 226, and the body-side communication unit 250. Note that although the imaging element 201 is installed in the camera body 200 in FIG. 3, the present invention is not limited thereto. The imaging element 201 may be installed, for example, inside the interchangeable lens 100.

The imaging element 201 includes an image sensor that images a subject. An optical image of the subject formed on a light reception surface of the imaging element 201 by the imaging optical system 102 of the interchangeable lens 100 is converted into an electric signal by the imaging element 201. Examples of the imaging element 201 include a complementary metal oxide semiconductor (CMOS) type image sensor, and a charge coupled device (CCD) type image sensor.

The imaging element control unit 202 controls imaging timing, exposure time, or the like of the imaging element 201 according to a command of the body-side CPU 220.

The analog signal processing unit 203 performs various types of analog signal processing on an analog image signal obtained by the imaging element 201 imaging the subject. The analog signal processing unit 203 of this example includes, for example, a sample and hold circuit, a color separation circuit, and a gain adjustment circuit.

The A/D converter 204 converts an analog image signal output from the analog signal processing unit 203 into a digital image signal.

The image input controller 205 temporarily stores the digital image signal output from the A/D converter 204 in the RAM 207 as image data. In a case in which the imaging element 201 is a CMOS-type image sensor, the A/D converter 204 is often built in the imaging element 201. Note that the analog signal processing unit 203, the A/D converter 204, and the image input controller 205 constitute an analog front end (AFE).

The digital signal processing unit 206 performs various types of digital signal processing on the image data stored in the RAM 207. The digital signal processing unit 206 in this example includes, for example, a brightness and color difference signal generation circuit, a gamma correction circuit, a sharpness correction circuit, a contrast correction circuit, a white balance correction circuit, and a resolution enhancement processing circuit (a point image restoration process circuit).

The compression and expansion processing unit 208 performs a compression process on uncompressed image data stored in the RAM 207. Further, the compression and expansion processing unit 208 performs an expansion process on the compressed image data.

The media control unit 210 performs control to record the image data compressed by the compression and expansion processing unit 208 in the memory card 212. Further, the media control unit 210 performs control to read the compressed image data from the memory card 212.

The display control unit 214 performs control to display the uncompressed image data stored in the RAM 207 on the monitor 216. For the monitor 216, a liquid crystal monitor or an organic electro luminescence (EL) monitor may be adopted.

In a case in which a live view image is displayed on the monitor 216, a digital image signal continuously generated by the digital signal processing unit 206 is temporarily stored in the RAM 207. The display control unit 214 converts the digital image signal temporarily stored in this RAM 207 to have a signal format for a display, and sequentially outputs the resultant signal to the monitor 216. Accordingly, the captured image is displayed on the monitor 216 in real time, such that imaging can be performed using the monitor 216 as an electronic viewfinder.

In a case in which imaging of the subject and recording of the image of the subject are performed, AE control and AF control are performed under the control of the body-side CPU 220 by half press of the shutter release button 22, and imaging is performed by full press. An image acquired by imaging is compressed in a predetermined compression format (for example, a JPEG format in the case of a still image or H264 in the case of a video) by the compression and expansion processing unit 208. The compressed image data is converted into an image file to which necessary ancillary information such as imaging date and time or imaging conditions is added, and then, the image file is stored in the memory card 212 via the media control unit 210.

The body-side CPU 220 collectively controls an entire operation of the imaging device 10. Further, the body-side CPU 220 constitutes a mounting determination unit that determines whether or not the interchangeable lens 100 and the teleconverter 300 have been mounted on the body mount 260.

The operation unit 222 includes the shutter release button 22, the shutter speed dial 23, and the exposure correction dial 24 illustrated in FIG. 1, and the MENU/OK key 27, the cross key 28, and the playback button 29 illustrated in FIG. 2. The body-side CPU 220 controls each unit of the imaging device 10 based on an input from the operation unit 222 or the like.

The clock unit 224 is a timer and measures time on the basis of a command from the body-side CPU 220. Further, the clock unit 224 is a calendar and measures current date and time.

The flash ROM 226 is a readable and writable nonvolatile memory, and stores various types of setting information or lens data, individual identification information of the interchangeable lens 100 and the teleconverter 300, combination identification information that is information unique to a combination of the interchangeable lens 100 and the teleconverter 300, and the like.

Various data necessary for a control program or control executed by the body-side CPU 220 is recorded in the ROM 228. The body-side CPU 220 controls each unit of the imaging device 10 according to the control program stored in the ROM 228 using the RAM 207 as a work area.

The AF detection unit 230 calculates a numerical value necessary for autofocus (AF) control on the basis of the digital image signal. In the case of so-called contrast AF, for example, an integration value (focus evaluation value) of a high frequency component of a signal of a G (green) pixel in a predetermined AF area is calculated. The body-side CPU 220 moves the focus lens 106 to a position at which the focus evaluation value is maximized. Note that AF is not limited to the contrast AF. For example, phase difference AF may be performed.

The AE/AWB detection unit 232 calculates a numerical value necessary for automatic exposure (AE) control and automatic white balance (AWB) control on the basis of the digital image signal. The body-side CPU 220 calculates brightness of the subject (subject brightness) on the basis of the numerical value obtained from the AE/AWB detection unit 232, and determines the diaphragm information (F-number) and the shutter speed from a predetermined program diagram.

The power control unit 240 applies a power supply voltage supplied from the battery 242 to each unit of the camera body 200 according to a command of the body-side CPU 220. Further, the power control unit 240 applies the power supply voltage supplied from the battery 242 to each unit of the interchangeable lens 100 and the teleconverter 300 via the body mount 260, the lens mount 160, and the distal end side mount 362 and the proximal end side mount 364 of the teleconverter 300 according to a command of the body-side CPU 220.

A lens power switch 244 performs switching between ON and OFF and switching between levels of the power supply voltage applied to the interchangeable lens 100 and the teleconverter 300 via the body mount 260, the lens mount 160, the distal end side mount 362, and the proximal end side mount 364 according to a command of the body-side CPU 220.

The body-side communication unit 250 performs signal transmission and reception (communication) to and from the lens-side communication unit 150 of the interchangeable lens 100 according to a command of the body-side CPU 220. Meanwhile, the lens-side communication unit 150 performs signal transmission and reception (communication) to and from the body-side communication unit 250 of the camera body 200 and the teleconverter-side communication unit 350 of the teleconverter 300 according to a command of the lens-side CPU 120.

<Configuration of Teleconverter>

The teleconverter 300 (accessory) includes a teleconversion lens 302, a teleconverter-side CPU 320, a flash ROM 326 (an accessory information storage unit), a teleconverter-side communication unit 350 (an accessory-side communication unit), the distal end side mount 362, and the proximal end side mount 364. The teleconverter-side microcomputer (MC) 352 includes the teleconverter-side CPU 320, the flash ROM 326, and the teleconverter-side communication unit 350.

The teleconversion lens 302 is a lens (or a lens group) for making a focal length longer than a focal length of the interchangeable lens 100 alone in a case where the interchangeable lens 100 and the teleconverter 300 are mounted. A rate of change in the focal length may have a value of 1.4 times, 2 times or the like.

The teleconverter-side CPU 320 is a central processing unit (CPU) of the teleconverter 300, and includes a RAM 322 and a ROM 324.

The flash ROM 326 is a nonvolatile memory that stores firmware of the teleconverter 300, data of optical characteristics (for example, a magnification of a focal length or a degree of change in a diaphragm), serial number (individual identification information), and the like.

The teleconverter-side CPU 320 controls the teleconverter-side communication unit 350 using the RAM 322 as a work area according to the control program (firmware) stored in the ROM 324 or the flash ROM 326.

In a state in which the interchangeable lens 100 is mounted on the camera body 200 via the teleconverter 300, the teleconverter-side communication unit 350 performs communication with the interchangeable lens 100 via the plurality of signal terminals provided in the lens mount 160 and the distal end side mount 362. Note that in the embodiment, the teleconverter 300 does not directly communicate with the camera body 200, and the interchangeable lens 100 that has received the request command from the camera body 200 performs transmission and reception to and from the teleconverter 300.

<Communication via Terminals>

FIG. 4 is an illustrative diagram illustrating the body mount 260 and the lens mount 160, peripheral portions thereof, and relevant portions in the teleconverter 300. In a state in which the interchangeable lens 100 is mounted on the camera body 200 via the teleconverter 300, the plurality of terminals 260a (ten terminals denoted by reference numerals "B01" to "B10" in FIG. 4 in this example) of the body mount 260 are brought into contact with the plurality of terminals of the proximal end side mount 364 of the teleconverter 300, respectively, and the plurality of terminals (ten terminals "L01" to "L10" in FIG. 4 in this example) of the lens mount 160 are brought into contact with the plurality of terminals 362a (FIG. 1) of the distal end side mount 362 of the teleconverter 300, respectively.

<Communication between Camera Body and Interchangeable Lens>

In the above configuration, communication between the camera body 200 and the interchangeable lens 100 will be described below. In the communication between the camera body 200 and the interchangeable lens 100, signals are transmitted and received via the plurality of terminals provided on the distal end side mount 362 and the proximal end side mount 364 of the teleconverter 300, but since the teleconverter-side CPU 320 or the teleconverter-side communication unit 350 is not involved in control of the transmission and reception between the camera body 200 and the interchangeable lens 100, description of the teleconverter 300 and the terminals thereof will be appropriately omitted hereinafter. Note that in the following description, the signal terminals are appropriately referred to as "terminals". For example, an INTR_BUSY signal terminal to be described below may be referred to as an "INTR_BUSY terminal".

A first terminal B01 (a +5 V terminal) of the body mount 260 is a first body-side power supply terminal for giving a +5 V voltage of the battery 242 from the camera body 200 to the interchangeable lens 100, and is connected to the power control unit 240 and the battery 242 via the lens power switch 244.

A second terminal B02 (a +3.3 V terminal) of the body mount 260 is a second body-side power supply terminal for giving a +3.3 V voltage of the battery 242 from the camera body 200 to the interchangeable lens 100.

A third terminal B03 (a ground (GND) terminal) and a fourth terminal B04 (a digital ground (DGND) terminal) of the body mount 260 are body-side ground terminals for giving a 0 V (ground voltage) from the camera body 200 to the interchangeable lens 100. The third terminal B03 and the fourth terminal B04 are connected to a ground of the camera body 200.

A fifth terminal B05 (a LENS_DET (Lens Detection) terminal) of the body mount 260 is a body-side terminal dedicated for detection of the interchangeable lens 100 and the teleconverter 300, as will be described in detail below.

A sixth terminal B06 to a tenth terminal B10 of the body mount 260 are a plurality of body-side signal terminals for signal transmission and reception to and from the interchangeable lens 100.

The sixth terminal B06 (an INTR_BUSY signal terminal) of the body mount 260 is a body-side busy signal terminal (an Inter Busy signal terminal) for notifying whether or not the interchangeable lens 100 or the camera body 200 is in a specific operation period.

The seventh terminal B07 (a VSYNC signal terminal) of the body mount 260 is a body-side signal terminal (a vertical synchronization signal terminal) for vertical synchronization between the camera body 200 and the interchangeable lens 100.

The eighth terminal B08 (an SCK signal terminal), the ninth terminal B09 (a MOSI signal terminal), and the tenth terminal B10 (a MISO signal terminal) of the body mount 260 are body-side communication signal terminals for serial communication between the camera body 200 and the interchangeable lens 100. The system clock (SCK) signal is a clock signal that is given from the camera body 200 serving as a master to the interchangeable lens 100 serving as a slave. The MOSI (Master Out/Slave In) signal is a signal that is output from the camera body 200 serving as a master and input to the interchangeable lens 100 serving as a slave. The MISO (Master In/Slave Out) signal is output from the interchangeable lens 100 serving as a slave and input to the camera body 200 serving as the master.

The fifth terminal B05 (LENS_DET (Lens Detection) terminal) of the body mount 260 is a body-side terminal dedicated for detection of the interchangeable lens 100 and the teleconverter 300. In this example, a high level (a high potential) indicates that the LENS_DET (Lens Detection) terminal of the body mount 260 and the LENS_DET terminal (a fifth terminal L05) of the lens mount 160 are in a non-contact state (a non-mounted state), and a low level (a low potential) indicates that the LENS_DET terminal of the body mount 260 and the LENS_DET terminal of the lens mount 160 are in a contact state (a mounted state) (via the distal end side mount 362 and the proximal end side mount 364 of the teleconverter 300).

The fifth terminal B05 (a LENS_DET terminal) of the body mount 260 is connected to the power control unit 240 and the battery 242 (FIG. 3) via a first pull-up resistor R1. Further, the ninth terminal B09 (a MOSI signal terminal) among the plurality of signal terminals (the sixth terminal B06 to the tenth terminal B10) for signal transmission and reception (communication) of the body mount 260 is connected to the battery 242 via a second pull-up resistor R2 and the lens power switch 244.

The second pull-up resistor R2 is connected to the lens power switch 244. In a state in which the lens power switch 244 is turned off (the non-power supply voltage supply state of the interchangeable lens 100), the ninth terminal B09 (the MOSI signal terminal) is not pulled up. The ninth terminal B09 (the MOSI signal terminal) is pulled up in a state in which the lens power switch 244 is turned on by the body-side CPU 220 (a power supply voltage supply state of the interchangeable lens 100). That is, the voltage of the ninth terminal L09 (the MOSI signal terminal) of the interchangeable lens 100 does not become at a high level only by turning on the power switch of the camera body 200, but in a case where the lens power switch 244 is turned on by the body-side CPU 220, the voltage of a ninth terminal L09 (the MOSI signal terminal) of the interchangeable lens 100 becomes at a high level. Accordingly, malfunction of the lens-side MC 152 on the interchangeable lens 100 side is prevented.

Figure 5:
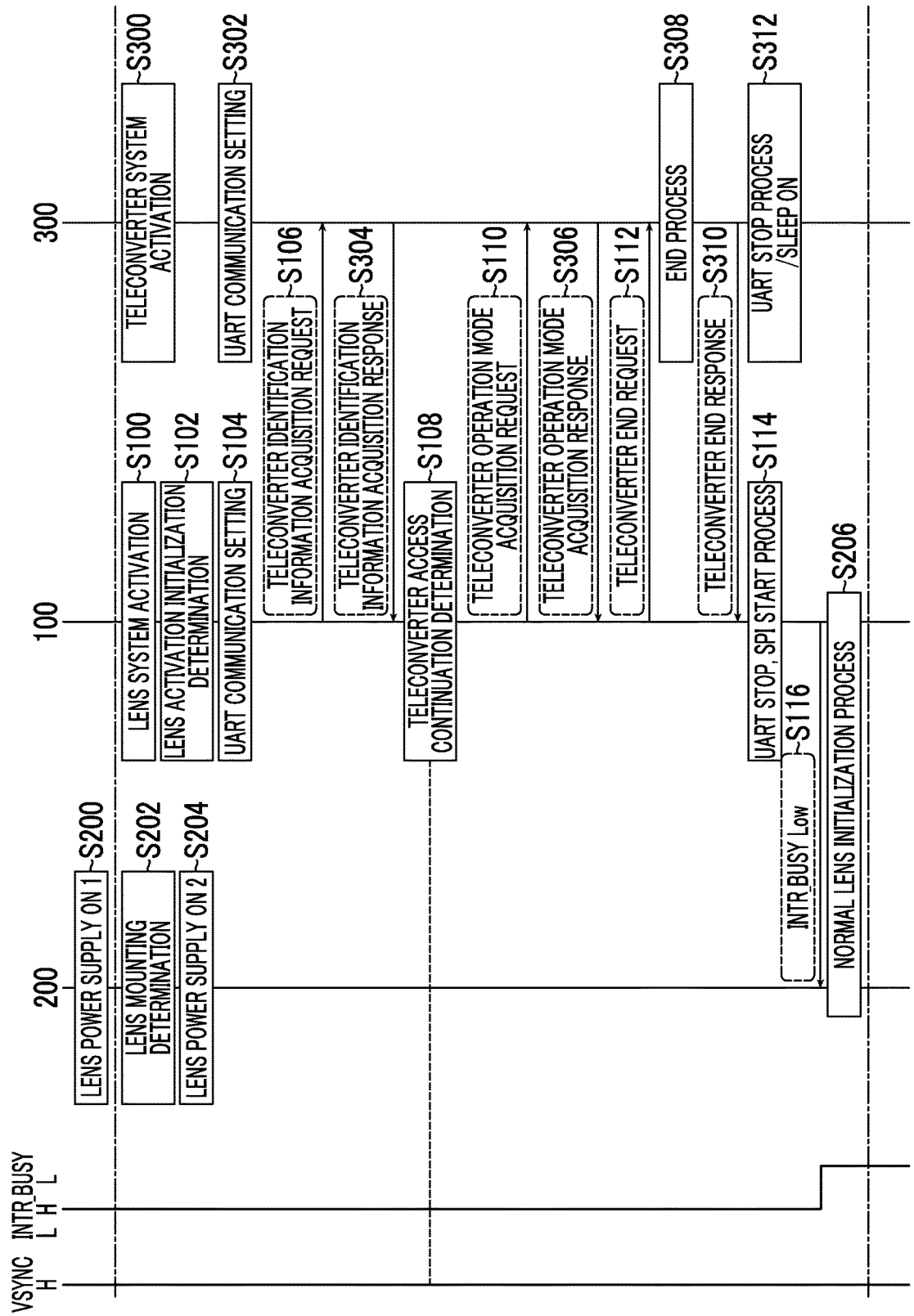
FIG. 5 is a diagram illustrating a normal activation sequence in the camera system according to the embodiment of the present invention.

The body-side CPU 220 of the camera body 200 sets only the fifth terminal B05 (the LENS_DET terminal) to a determination target and determines whether or not the fifth terminal B05 (the LENS_DET terminal) is at a low level before the pre-power supply voltage is supplied to the interchangeable lens 100 and the teleconverter 300 via the body-side power supply terminal of the body mount 260 (step S200 in FIG. 5). In a case where the LENS_DET terminal is at a low level in this determination, the body-side CPU 220 of the camera body 200 determines whether or not both the LENS_DET terminal and the ninth terminal B09 (the MOSI signal terminal) at the time of non-communication are at the low level after the pre-power supply voltage is supplied to the interchangeable lens 100 and the teleconverter 300 via the body-side power supply terminal of the body mount 260 (step S202 in FIG. 5).

The fifth terminal L05 (the LENS_DET terminal) of the lens mount 160 is connected to the ground (the GND terminal and the DGND terminal). Further, the ninth terminal L09 (the MOSI signal terminal) among the plurality of signal terminals (a sixth terminal L06 to a tenth terminal L10) of the lens mount 160 is connected to the ground via a pull-down resistor R3 that has a resistance value sufficiently smaller than the second pull-up resistor R2.

As the mounting determination unit, the body-side CPU 220 determines whether or not the lens mount 160, and the distal end side mount 362 and the proximal end side mount 364 of the teleconverter 300 are mounted on the body mount 260 (that is, a determination as to whether or not the interchangeable lens 100 and the teleconverter 300 are mounted on the camera body 200) on the basis of a voltage (high level/low level) of the fifth terminal B05 (the LENS_DET terminal) of the body mount 260 and a voltage (high level/low level) of a specific body-side signal terminal (the MOSI signal terminal in this example) at the time of non-communication. Specifically, in a case where both the voltage of the fifth terminal B05 (the LENS_DET terminal) of the camera body 200 and the voltage of the ninth terminal B09 (the MOSI signal terminal) at the time of non-communication become at a low level, the body-side CPU 220 determines that the interchangeable lens 100 and the teleconverter 300 are mounted on the body mount 260 (step S202 in FIG. 5).

Further, the lens-side CPU 120 may determine whether or not the lens mount 160 is mounted on the body mount 260 (that is, determine whether or not the interchangeable lens 100 is mounted on the camera body 200) on the basis of the voltage of the fifth terminal L05 (the LENS_DET terminal) of the lens mount 160 and the voltage of the specific lens-side signal terminal (MOSI signal terminal in this example) at the time of non-communication. In this case, the lens-side CPU 120 determines that the interchangeable lens 100 and the teleconverter 300 are mounted on the body mount 260 in a case where both the voltage of the LENS_DET terminal and the voltage of the MT_MOSI signal terminal at the time of non-communication of the interchangeable lens 100 become at a low level.

In a case where the body-side CPU 220 determines that the interchangeable lens 100 and the teleconverter 300 have been mounted on the body mount 260, the body-side CPU 220 supplies a main power supply voltage to the interchangeable lens 100 (step S204 in FIG. 5).

The body-side MC 252 includes a terminal for detecting a change (high level/low level) in a potential of the sixth terminal B06 (an INTR_BUSY signal terminal) of the body mount 260, a terminal for applying a synchronization signal to the seventh terminal B07 (a VSYNC signal terminal) of the body mount 260, an interface (SPI: Serial Peripheral Interface) for serial communication using the eighth terminal B08 to the tenth terminal B10 (hereinafter also referred to as "communication signal terminals") of the body mount 260, a terminal for detecting a change (high level/low level) in a potential of the fifth terminal B05 (the LENS_DET terminal) of the body mount 260, and a terminal for updating firmware of the interchangeable lens 100.

The lens-side MC 152 includes a terminal for detecting a change (high level/low level) in a potential of the sixth terminal L06 (INTR_BUSY signal terminal) of the lens mount 160, an interface (SPI) for serial communication using the eighth terminal L08 to the tenth terminal L10 (communication signal terminals) of the lens mount 160, and a terminal for updating the firmware of the interchangeable lens 100.

<Communication between Interchangeable Lens and Teleconverters>

Next, communication between the interchangeable lens 100 and the teleconverter 300 will be described. The communication between the interchangeable lens 100 and the teleconverter 300 is performed using a two-line Universal Asynchronous Receiver Transmitter (UART) scheme in which the interchangeable lens 100 is a master and the teleconverter 300 is a slave.

In a state in which the interchangeable lens 100 is mounted on the camera body 200 via the teleconverter 300, the ten terminals 362a of the distal end side mount 362 of the teleconverter 300 are brought into contact with the first terminal L01 to the tenth terminal L10 of the interchangeable lens 100, respectively, and the ten terminals of the proximal end side mount 364 are brought into contact with the first terminal B01 to the tenth terminal B10 of the camera body 200, respectively. Communication signal lines between the interchangeable lens 100 and the teleconverter 300 are connected to communication signal lines of the interchangeable lens 100 via these terminals.

Specifically, signal lines for a pre-power supply voltage supply signal and a main power supply voltage supply signal, a mounting detection signal (a LENS_DET signal) of the interchangeable lens 100 and the teleconverter 300, a general-purpose bidirectional interrupt signal (INTR_BUSY signal), a 2-line UART reception signal (a MOSI signal), a 2-line UART transmission signal (a MISO signal), and a rewrite mode selection signal (VSYNC) at the time of firmware updating of the teleconverter 300 are respectively connected to the communication signal lines between the interchangeable lens 100 and the camera body 200.

The LENS_DET signal is at a low level (a low potential) in a case where the interchangeable lens 100 and the teleconverter 300 are mounted on the camera body, and is at a high level (a high potential) in a case where the interchangeable lens 100 and the teleconverter 300 are not mounted. The MOSI signal is used in a case where the teleconverter 300 receives a signal from the interchangeable lens 100 and the MISO signal is used in a case where the teleconverter 300 transmits a signal to the interchangeable lens 100. The voltage levels of these signals are both +3.3 V.

Note that the teleconverter 300 does not directly communicate with the camera body 200, and the interchangeable lens 100 that has received a request command from the camera body 200 performs transmission and reception to and from the teleconverter 300.

<Normal Activation Sequence>

Next, a normal activation sequence in the imaging device 10 of the embodiment (in a case where a mode is not a mode in which the firmware of the teleconverter 300 is updated) will be described with reference to FIG. 5.

In a case where a power switch (not shown) provided in the operation unit 222 of the camera body 200 is turned on, the body-side CPU 220 determines whether or not the fifth terminal B05 (the LENS_DET terminal) of the body mount 260 is at a low level as described above, and then, supplies the pre-power supply voltage to the interchangeable lens 100 and the teleconverter 300 (step S200). Note that in this case, the body-side CPU 220 sets the VSYNC signal to a high level, and the lens-side CPU 120 sets the INTR_BUSY signal to a high level. Note that the pre-power supply voltage is supplied in a case where the VSYNC signal is at a high level, but since a setting of the terminals of the camera body 200 to be described below is not performed at this point, signals from the interchangeable lens 100 and the teleconverter 300 are not recognized as signals.

In a case where the LENS_DET terminal is at a low level in the above determination, the body-side CPU 220 detects the signal levels of the LENS_DET terminal and the MOSI signal terminal at the time of non-communication after the pre-power supply voltage is supplied in step S200, determines that the interchangeable lens 100 and the teleconverter 300 have been mounted on the body mount 260 in a case where both signals become at low level (step S202), and supplies main power supply voltage (step S204).

In a case where the pre-power supply voltage is supplied in step S200, the lens-side CPU 120 of the interchangeable lens 100 activates the lens system (step S100), determines initialization of the lens activation (step S102), and performs a UART communication setting (step S104). On the other hand, in a case where the pre-power supply voltage is supplied, the teleconverter-side CPU 320 of the teleconverter 300 activates the system of the teleconverter 300 (step S300) and sets the UART communication setting (step S302).

In a case where the processes in steps S104 and S302 end, the lens-side CPU 120 transmits an acquisition request for teleconverter identification information (including a serial number as the individual identification information of the teleconverter 300 and optical characteristic data of the teleconverter 300) to the teleconverter 300 (step S106: accessory information acquisition step). The optical characteristic data includes a focal length scaling ratio, but the present invention is not limited thereto and may include data such as a rate of change in a diaphragm value (F-number). In a case where the lens-side CPU 120 receives the teleconverter identification information from the teleconverter 300 before timeout (step S304: accessory information acquisition step), the lens-side CPU 120 then generates (acquires) combination identification information (combination serial number) that is information unique to the combination of the interchangeable lens 100 and the teleconverter 300, and lens data related to the combination of the interchangeable lens 100 and the teleconverter 300.

In a case where the lens-side CPU 120 of the interchangeable lens 100 receives the teleconverter identification information in step S304, the lens-side CPU 120 of the interchangeable lens 100 performs a determination (a teleconverter access continuation determination) as to whether or not to continue access to the teleconverter 300 according to an output level of the VSYNC terminal (step S108). In the teleconverter access continuation determination, in a case where the VSYNC terminal is at the low level, the lens-side CPU 120 of the interchangeable lens 100 determines to continue the teleconverter access. In a case where the VSYNC terminal is at the high level, the lens-side CPU 120 of the interchangeable lens 100 determines to stop the teleconverter access. In the normal activation sequence illustrated in FIG. 5 (in a case where the firmware updating of the teleconverter 300 is not performed), since the VSYNC signal is set to the high level, the lens-side CPU 120 of the interchangeable lens 100 determines not to continue the teleconverter access.

Then, the interchangeable lens 100 transmits a teleconverter operation mode acquisition request to the teleconverter 300 (step S110), and the teleconverter 300 returns a response to the teleconverter operation mode acquisition request (step S306). Here, the teleconverter operation mode includes, for example, a normal operation mode, a firmware update mode (FWUP date mode), and a standby mode. Commands that can be transmitted are limited for each operation mode. For example, in the normal operation mode, a teleconverter end command is received, whereas in the FWUP date mode, the teleconverter end command is not received. Further, the standby mode is an operation mode in which all commands are not received.

The activation sequence illustrated in FIG. 5 is the normal operation mode in which the firmware update of the teleconverter 300 is not performed, and the lens-side CPU 120 transmits a teleconverter end request (teleconverter end command) to the teleconverter 300 (step S112). In a case where the teleconverter-side CPU 320 receives the teleconverter end request, the teleconverter-side CPU 320 performs a process of ending a teleconverter system to set the teleconverter 300 to the standby mode (step S308), returns a teleconverter end response to the interchangeable lens 100 (step S310), and performs a process of stopping the UART communication to enter sleep state (step S312).

In a case where the lens-side CPU 120 receives the teleconverter end response, the lens-side CPU 120 performs a process of stopping the UART communication and a process of starting SPI communication (step S114), and sets the INTR_BUSY signal to a low level (step S116: lens initialization completion notification interrupt signal). This signal is received, and a normal lens initialization process (a communication terminal setting of the camera body 200 and an initial position drive of the interchangeable lens 100, lens data acquisition request and response according to the combination of the interchangeable lens 100 and the teleconverter 300, or the like) is performed between the camera body 200 and the interchangeable lens 100 (step S206).

<Generation of Serial Number related to Combination>

Figure 6:
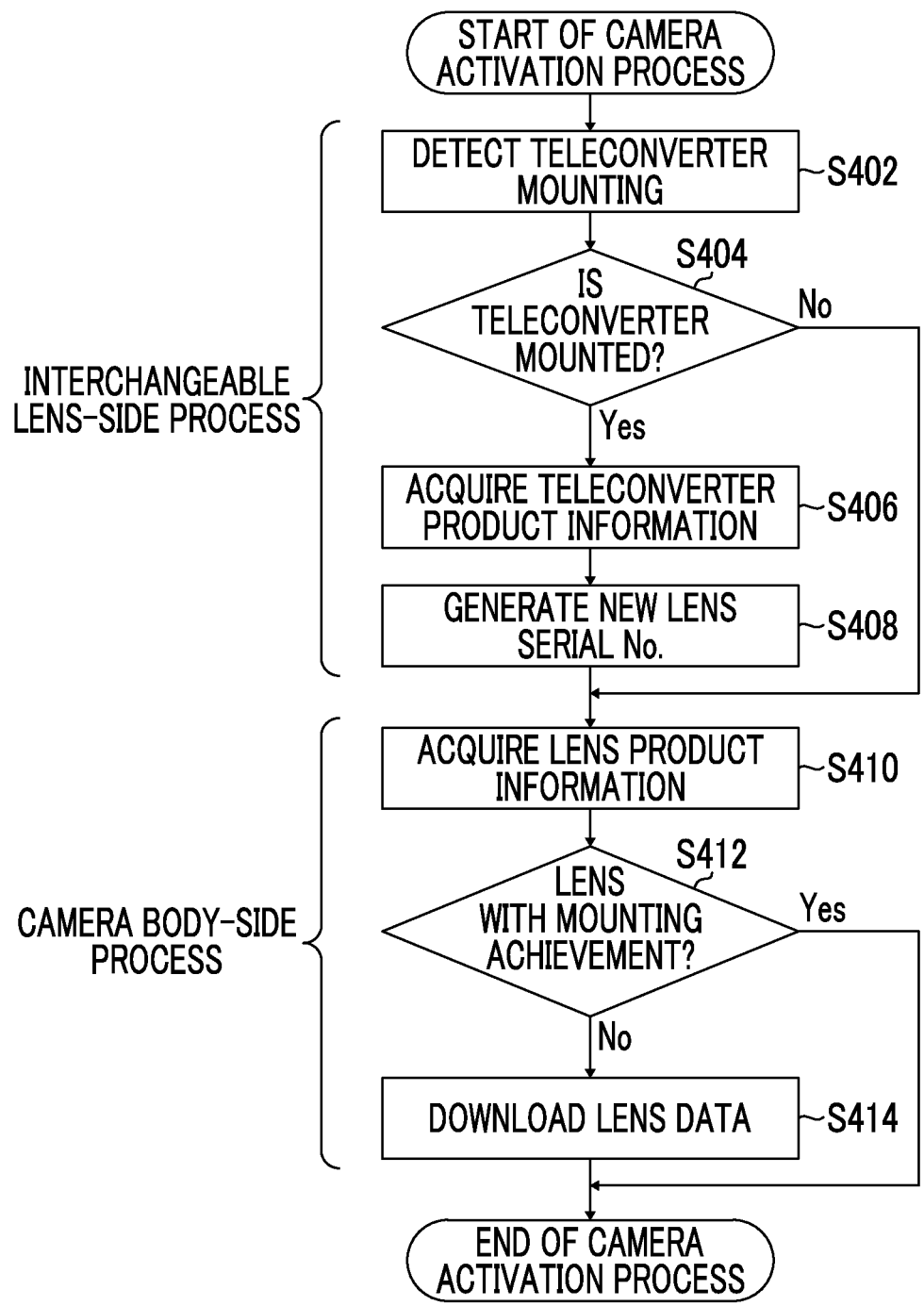
FIG. 6 is a flowchart illustrating a portion regarding generation of combination identification information (a serial number) in a normal activation sequence of a camera system according to the embodiment of the present invention.

Next, generation of a serial number related to a combination of the interchangeable lens 100 and the teleconverter 300 will be described. FIG. 6 is a flowchart illustrating a process according to serial number generation in the activation sequence of the imaging device 10 (a camera system). Note that in FIG. 6, steps S402 to S408 are processes in the interchangeable lens 100, and S410 to S414 are processes in the camera body 200.

In a case where a camera start process is started, the lens-side CPU 120 of the interchangeable lens 100 performs teleconverter mounting detection (step S402). In this mounting detection, in a case where there has been a response (step S304 in FIG. 5) to the request for acquisition of the teleconverter identification information (step S106 in FIG. 5) before timeout, it is determined that "the teleconverter 300 is mounted".

In a case where it is determined that "the teleconverter 300 is mounted" (Yes in step S404), the serial number of the teleconverter 300 included in the received teleconverter identification information is acquired (step S406), and the serial number (combination identification information) unique to the combination of the interchangeable lens 100 and the teleconverter 300 is generated and transmitted to the camera body 200 (step S408: an identification information generation step and an identification information transmission step). Details of the serial number generation process will be described below in step S408. On the other hand, in a case where it is determined that "the teleconverter 300 is not mounted" (No in step S404), the processes of steps S406 and S408 are skipped and the process proceeds to step S410.

Note that the teleconverter access continuation determination (step S108 in FIG. 5) is performed between steps S406 and S408, and in a step subsequent to step S408, lens data optimized for the teleconverter 300 is generated.

In step S410, the body-side CPU 220 of the camera body 200 communicates with the interchangeable lens 100 to acquire lens product information including a serial number. The process of step S410 is performed during the "normal lens initialization process" (step S206 in FIG. 5), and in a case where only the interchangeable lens 100 is mounted on the camera body 200, the serial number of the interchangeable lens 100 itself is acquired, and in a case where the interchangeable lens 100 and the teleconverter 300 are mounted, the "serial number unique to the combination" (combination identification information) generated in step S408 is acquired.

In a case where the serial number of the interchangeable lens 100 itself or the serial number unique to the combination of the interchangeable lens 100 and the teleconverter 300 is acquired in step S410, it is determined whether or not there is a mounting achievement of the interchangeable lens 100 and the teleconverter 300 (the lens system) mounted on the camera body 200 on the basis of the acquired serial number (step S412). In a case where there is the mounting achievement (Yes in step S412), the process ends since the lens data has already been acquired and stored. In a case where there is no mounting result (No in step S412), since lens data has not been acquired and stored, the lens data (lens data optimized for the teleconverter 300 in a case where the teleconverter 300 is mounted) is requested to the interchangeable lens 100, and downloaded (step S414). Note that the request and the download of the lens data in step S414 are performed in step S206 (the normal lens initialization step) in FIG. 5.

There are a case where the interchangeable lens 100 is mounted alone on the camera body 200 and a case where the interchangeable lens 100 is mounted on the camera body via the teleconverter 300. Therefore, in a case where a determination of mounting achievement is made according to only the individual identification information (serial number) of the interchangeable lens 100, there is mounting achievement in the "interchangeable lens 100" alone, but it is determined that "there is mounting achievement" even in a case where there is no mounting achievement in the combination with the teleconverter 300, and lens data optimized for the teleconverter 300 cannot be acquired. However, in the embodiment, since the "serial number unique to the combination of the interchangeable lens 100 and the teleconverter 300" is generated as described above, it is possible to correctly determine the mounting achievement and to acquire appropriate lens data optimized for the teleconverter 300 even in a case where the interchangeable lens 100 is mounted on the camera body 200 via the teleconverter 300. Further, the combination of the interchangeable lens 100 and the teleconverter 300 can be identified using one number "the serial number unique to the combination of the interchangeable lens 100 and the teleconverter 300", and the respective serial numbers of the interchangeable lens 100 and the teleconverter 300 may be stored.

Further, since the "serial number unique to the combination of the interchangeable lens 100 and the teleconverter 300" is generated with the same data format and data size as those of the serial number of the interchangeable lens 100 as will be described in detail below, suitability of the serial number is secured even in a case where the interchangeable lens 100 is mounted on the camera body 200 via the teleconverter 300.

<Specific Example of Serial Number Generation Related to Combination>

Figure 7:
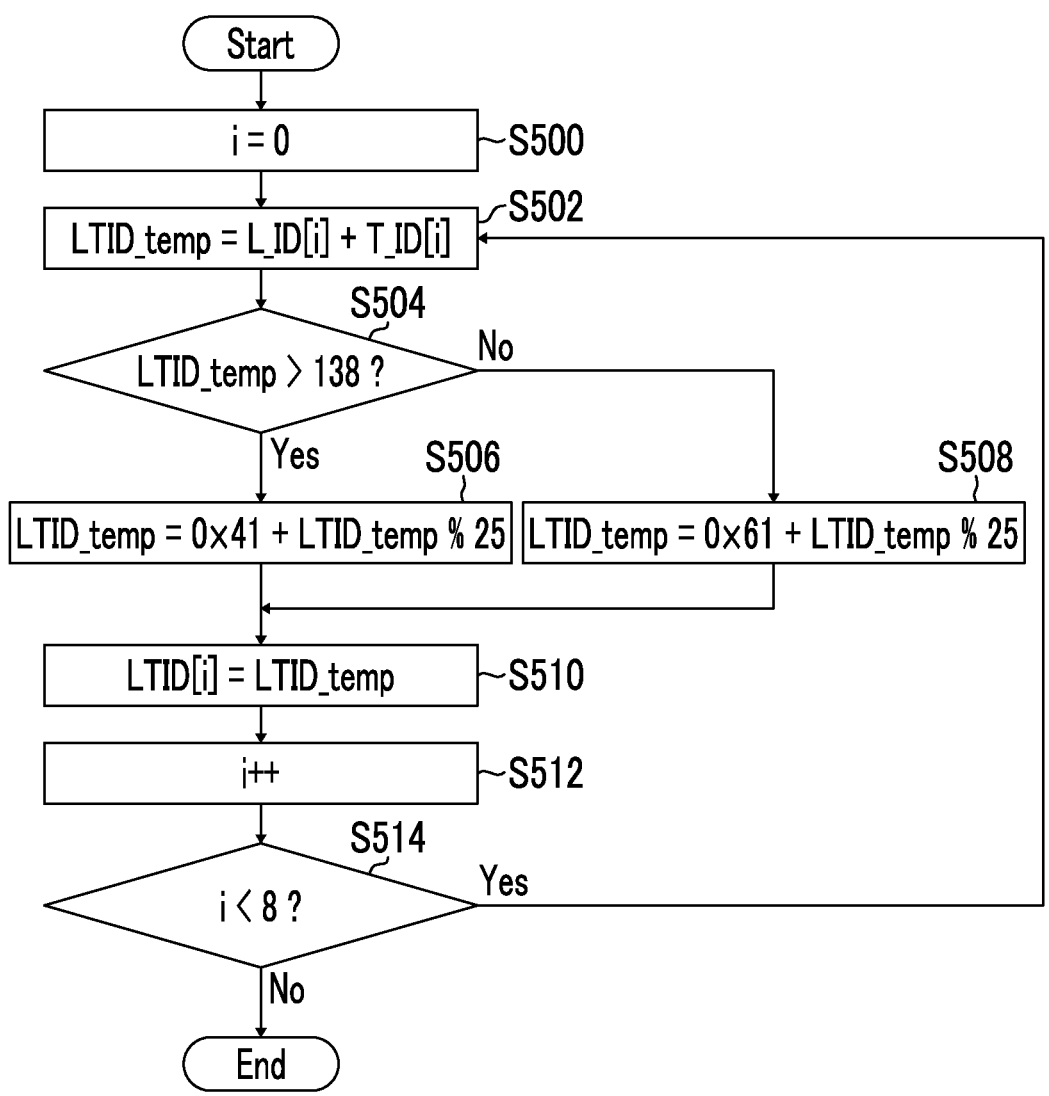
FIG. 7 is a flowchart illustrating a procedure of serial number generation for a combination of an interchangeable lens and a teleconverter.

Next, a specific example of serial number generation related to the combination of the interchangeable lens 100 and the teleconverter 300 will be described with reference to FIGS. 7 to 9. FIG. 7 is a flowchart illustrating a process of generating a serial number and illustrates the process of step S408 in FIG. 6 in detail. Further, FIG. 8 is a diagram illustrating a sample of a serial number, and FIG. 9 is a table showing some of ASCII codes. Note that in FIG. 8, numbers 0 to 7 of a first row indicate 0-th to 7-th bytes of the serial number.

In this embodiment, the serial number of the interchangeable lens 100 alone is 8-byte data consisting of numerals and uppercase of the alphabet, and a specific value thereof is "48P10058" as shown in a second row of FIG. 8. Similarly, the serial number of the teleconverter 300 alone is also 8-byte data consisting of numerals and capital letters of the alphabet, and a specific value thereof is "55P20045". These serial numbers can be represented by ASCII codes as illustrated in FIGS. 8 and 9.

In a case where the serial number generation process is started, a byte (an i-th byte) that is a processing target is initialized to a 0-th byte (step S500), and an ASCII code of an i-th byte of the serial number (L_ID[i]) of the interchangeable lens 100 and an ASCII code of the i-th byte of the serial number (T_ID[i]) of the teleconverter 300 are added and an addition result is set as LTID_temp (step S502). In the example of FIG. 8, since the 0-th bytes of the serial numbers are 4 and 5 respectively, and the ASCII codes are 52 and 53 (in the case of decimal notation), the addition result (L_ID[i]+T_ID[i]) is 105.

Next, it is determined whether or not the addition result (LTID_temp) is greater than 138 (step S504). In a case where the addition result (LTID_temp) is greater, the process proceeds to step S506, and in a case where the addition result (LTID_temp) is smaller, the process proceeds to step S508. In the embodiment, since the serial numbers of the interchangeable lens 100 and the teleconverter 300 are consisting of numbers and uppercase of the alphabet, the ASCII codes are in ranges of 48 to 57 and 65 to 90 (in the case of decimal notation), and the addition results are in a range of 96 (in the case of 0+0) to 180 (in the case of Z+Z). An average (=(96+180)/2) of this range is 138, and as will be described below, the i-th byte of the serial number according to the combination is consisting of uppercase or lowercase of the alphabet according to on whether or not the addition result is greater than 138.

In the example of FIG. 8, since the addition result in step S502 is 105 and is smaller than 138, a determination in step S504 is negative and the process advances to step S508, in which 0x61 (Hexadecimal notation; 97 in decimal notation) is added to a remainder (indicated as "LTID_temp % 25" in FIG. 7) after the addition result is divided by 25, and a result thereof is an ASCII code (LTID[i]) indicating the i-th byte of the serial number related to the combination (step S510). "0x61" (hexadecimal notation) is an ASCII code indicating the lowercase "a" of the alphabet, and LTID[i] is 97 to 122 (corresponding to the lowercase of the alphabet) according to the value of the remainder (LTID_temp % 25).

In the example of FIG. 8, since the addition result in step S502 is 105 and a remainder after this addition result is divided by 25 is 5, this is added to 97 (0x61), resulting in 102 (0x66). That is, the 0-th byte of the serial number related to the combination is "f" (lowercase of the alphabet).

In a case where the 0-th byte of the serial number is determined in this way, the value of i is incremented (step S512), and a process up to step S512 is repeated for the 7-th byte (during a period of Yes in step S514). In the example of FIG. 8, the serial number related to the combination is "fkMbzalq".

Note that in a case where the addition result in step S502 is greater than 138, the determination in step S504 is performed and the process proceeds to step S506, in which a remainder after the addition result is divided by 25 is added to 0x41 (hexadecimal notation; 65 in decimal notation), and a result thereof is an ASCII code (LTID[i]) indicating the i-th byte of the serial number related to the combination (step S510). "0x41" (hexadecimal notation) is an ASCII code indicating an uppercase "A" of the alphabet, and LTID[i] is 65 to 90 (a range of uppercases A to Z of the alphabet) according to a value of the remainder (LTID_temp % 25).

Thus, in the embodiment, the serial number unique to the combination of the interchangeable lens 100 and the teleconverter 300 is 8-byte data consisting of alphabets (uppercase or lowercase) and can be represented by ASCII code. That is, since the serial number unique to the combination has the same data format and data size (8-byte data represented by the ASCII code) as those of the serial number of the interchangeable lens 100 and the teleconverter 300, suitability of the serial number is secured even in a case where the interchangeable lens 100 is mounted on the camera body 200 via the teleconverter 300. Further, since the serial number of the interchangeable lens 100 and the teleconverter 300 consists of numbers and alphabet uppercase, whereas the serial number unique to the combination consists of the uppercase or the lowercase of the alphabet, there is no duplicate of serial numbers.

<Process in Camera Body>

In a case where the unique serial number (combination identification information) and lens data are generated for the combination of the interchangeable lens 100 and the teleconverter 300, the combination identification information and the lens data are transmitted to the camera body 200 in association with each other, and are recorded on the flash ROM 226. Accordingly, it is possible to recognize a correspondence relationship between the combination identification information and the lens data. Further, in a case where a subject is imaged by the imaging device 10 and a captured image is acquired, the camera body 200 records the serial number (individual identification information) of the interchangeable lens 100 in the data file of the captured image in a case where recording the captured image. For example, the serial number of the interchangeable lens 100 is recorded in a header portion of a file in an Exchangeable image file (Exif) format. Therefore, by referring to the data file of the captured image, it is possible to recognize the interchangeable lens 100 used for acquisition of the captured image.

Although the example of the present invention has been described above, the present invention is not limited to the above-described embodiments, and various modifications can be made without departing from the spirit of the present invention.

EXPLANATION OF REFERENCES

100: interchangeable lens
120: lens-side CPU
150: lens-side communication unit
160: lens mount
200: camera body
220: body-side CPU
250: body-side communication unit
260: body mount
300 teleconverter
320: teleconverter-side CPU
350: teleconverter-side communication unit
362: distal end side mount
364: proximal end side mount

What is claimed is:

1. A lens system comprising an interchangeable lens, and an accessory that is mounted between the interchangeable lens and a camera body,
   wherein the accessory includes
   an accessory-side communication unit that communicates with the interchangeable lens; and
   an accessory information storage unit in which individual identification information of the accessory and information on an optical characteristics of the accessory are stored, and
   the accessory-side communication unit transmits the individual identification information of the accessory and information on the optical characteristics of the accessory to the interchangeable lens,
   wherein the interchangeable lens includes
   a lens-side communication unit that communicates with the camera body and the accessory;
   an accessory information acquisition unit that communicates with the accessory to acquire individual identification information of the accessory;
   an interchangeable lens information storage unit that stores individual identification information of the interchangeable lens; and
   an identification information generation unit that generates combination identification information which is information unique to a combination of the interchangeable lens and the accessory on the basis of the acquired individual identification information of the accessory and the stored individual identification information of the interchangeable lens,
   wherein the lens-side communication unit transmits the generated combination identification information to the camera body.

2. The lens system according to claim 1, wherein the identification information generation unit generates the combination identification information according to the same format and data size as the individual identification information of the interchangeable lens.

3. The lens system according to claim 1, further comprising:
   a lens data acquisition unit that acquires lens data corresponding to the combination of the interchangeable lens and the accessory,
   wherein the lens-side communication unit transmits the combination identification information and the acquired lens data to the camera body in association with each other.

4. The lens system according to claim 2, further comprising:
   a lens data acquisition unit that acquires lens data corresponding to the combination of the interchangeable lens and the accessory,
   wherein the lens-side communication unit transmits the combination identification information and the acquired lens data to the camera body in association with each other.

5. The lens system according to claim 3,
   wherein the accessory information acquisition unit acquires information on the optical characteristics of the accessory,
   the interchangeable lens information storage unit stores lens data of the interchangeable lens, and
   the lens data acquisition unit generates lens data corresponding to the combination of the interchangeable lens and the accessory on the basis of the acquired information on the optical characteristics of the accessory and the stored lens data of the interchangeable lens.

6. The lens system according to claim 4,
   wherein the accessory information acquisition unit acquires information on the optical characteristics of the accessory,
   the interchangeable lens information storage unit stores lens data of the interchangeable lens, and
   the lens data acquisition unit generates lens data corresponding to the combination of the interchangeable lens and the accessory on the basis of the acquired information on the optical characteristics of the accessory and the stored lens data of the interchangeable lens.

7. The lens system according to claim 1, wherein the lens-side communication unit communicates with the accessory via a communication signal line between the camera body and the interchangeable lens.

8. The lens system according to claim 2, wherein the lens-side communication unit communicates with the accessory via a communication signal line between the camera body and the interchangeable lens.

9. The lens system according to claim 3, wherein the lens-side communication unit communicates with the accessory via a communication signal line between the camera body and the interchangeable lens.

10. The lens system according to claim 4, wherein the lens-side communication unit communicates with the accessory via a communication signal line between the camera body and the interchangeable lens.

11. The lens system according to claim 5, wherein the lens-side communication unit communicates with the accessory via a communication signal line between the camera body and the interchangeable lens.

12. The lens system according to claim 6, wherein the lens-side communication unit communicates with the accessory via a communication signal line between the camera body and the interchangeable lens.

13. The lens system according to claim 1, wherein the individual identification information of the accessory is described according to the same data format and data size as the individual identification information of the interchangeable lens.

14. The lens system according to claim 2, wherein the individual identification information of the accessory is described according to the same data format and data size as the individual identification information of the interchangeable lens.

15. The lens system according to claim 1, wherein the accessory-side communication unit communicates with the interchangeable lens via a communication signal line between the camera body and the interchangeable lens.

16. The lens system according to claim 1, wherein the accessory comprises a teleconversion lens that makes a focal length of the lens system longer than a focal length of the interchangeable lens in a state in which the accessory is mounted on the interchangeable lens.

17. A camera system including the lens system according to claim 1, and a camera body on which the lens system is mounted,
   wherein the camera body comprises:
   a lens data storage unit that stores combination identification information and lens data of the lens system in association with each other;
   a lens system information acquisition unit that communicates with the interchangeable lens and acquires the combination identification information for the lens system mounted on the camera body;

a determination unit that determines whether or not the lens data of the lens system mounted on the camera body is stored in the lens data storage unit on the basis of the acquired combination identification information; and a lens data acquisition unit that acquires the lens data of the mounted lens system from the interchangeable lens in a case where it is determined that the lens data of the mounted lens system is not stored.

18. The camera system according to claim 17, wherein in a case where a captured image obtained by imaging a subject is recorded, the camera body records individual identification information of the interchangeable lens in a data file of the captured image irrespective of whether or not the accessory is mounted on the camera body.

* * * * *